United States Patent
Cho et al.

(10) Patent No.: US 8,478,600 B2
(45) Date of Patent: Jul. 2, 2013

(54) INPUT/OUTPUT APPARATUS BASED ON VOICE RECOGNITION, AND METHOD THEREOF

(75) Inventors: Kwan-Hyun Cho, Daejon (KR); Mun-Sung Han, Daejon (KR); Jun-Seok Park, Daejon (KR); Young-Giu Jung, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1198 days.

(21) Appl. No.: 12/093,091

(22) PCT Filed: Sep. 11, 2006

(86) PCT No.: PCT/KR2006/003605
§ 371 (c)(1),
(2), (4) Date: May 8, 2008

(87) PCT Pub. No.: WO2007/055470
PCT Pub. Date: May 18, 2007

(65) Prior Publication Data
US 2008/0288260 A1    Nov. 20, 2008

(30) Foreign Application Priority Data
Nov. 11, 2005  (KR) .................. 10-2005-0107944

(51) Int. Cl.
*G10L 21/00*  (2006.01)
*G10L 15/26*  (2006.01)
*G06F 3/16*  (2006.01)

(52) U.S. Cl.
USPC ............................. 704/275; 704/235; 715/728

(58) Field of Classification Search
None
See application file for complete search history.

(56) References Cited

U.S. PATENT DOCUMENTS

| | | | | |
|---|---|---|---|---|
| 5,386,494 A | * | 1/1995 | White | 704/270.1 |
| 5,664,061 A | * | 9/1997 | Andreshak et al. | 704/275 |
| 5,677,990 A | * | 10/1997 | Junqua | 704/255 |
| 5,677,993 A | * | 10/1997 | Ohga et al. | 704/257 |
| 5,748,974 A | * | 5/1998 | Johnson | 704/9 |
| 5,818,423 A | * | 10/1998 | Pugliese et al. | 345/157 |
| 5,884,249 A | * | 3/1999 | Namba et al. | 704/9 |
| 6,542,866 B1 | * | 4/2003 | Jiang et al. | 704/255 |
| 7,036,080 B1 | * | 4/2006 | James et al. | 715/728 |
| 2002/0158827 A1 | | 10/2002 | Zimmerman | |

FOREIGN PATENT DOCUMENTS

| KR | 19990041133 | 6/1999 |
|---|---|---|
| KR | 1020010009476 | 2/2001 |

(Continued)

OTHER PUBLICATIONS

International Seach Report mailed Dec. 19, 2006; PCT/KR2006/003605.

*Primary Examiner* — Brian Albertalli
(74) *Attorney, Agent, or Firm* — Ladas & Parry LLP

(57) ABSTRACT

Provided is an input/output apparatus based on voice recognition, and a method thereof. An object of the apparatus is to improve a user interface by making pointing input and command execution such as application program control possible according to a voice command of a user possible based on a voice recognition technology without individual pointing input device such as a mouse and a touch pad, and a method thereof. The apparatus includes: a voice recognizer for recognizing a voice command inputted from outside; a pointing controller for calculating a pointing location on a screen which corresponds to a voice recognition result transmitted from the voice recognizer; a displayer for displaying a screen; and a command controller for processing diverse commands related to a current pointing location.

14 Claims, 2 Drawing Sheets

FOREIGN PATENT DOCUMENTS

| | | |
|---|---|---|
| KR | 1020010098120 A | 11/2001 |
| KR | 1020020030156 | 4/2002 |
| KR | 1020020082369 | 10/2002 |
| KR | 1020030010279 | 2/2003 |

* cited by examiner

INPUT/OUTPUT APPARATUS BASED ON VOICE RECOGNITION, AND METHOD THEREOF

TECHNICAL FIELD

The present invention relates to an input/output apparatus based on voice recognition, and a method thereof; and, more particularly, to an input/output apparatus that can input and execute pointing data and a command to control a system or an application program according to a voice command of a user based on a voice recognition technology without a hardware pointing input device, such as a mouse and a touch pad, and a method thereof.

BACKGROUND ART

In the present invention, a 'mobile terminal' means a terminal with which one can input/output diverse information in motion, such as a wireless communication terminal, an MPEG Audio Layer-3 (MP3) player and a Portable Multimedia Player (PMP).

In the present invention, a 'wireless communication terminal' means a terminal capable of wireless communication such as a mobile communication terminal, a personal communication system (PCS), a personal digital assistant (PDA), a smart phone, International Mobile Telecommunication 2000 (IMT-2000) and wireless local area network (LAN) terminal.

Recent increase in the use of small mobile terminals such as a wireless communication terminal makes it possible to use diverse services while communicating. The wireless communication terminal provides diverse additional services such as wireless Internet and multimedia data input/output in addition to a simple calling function. The services are expected to be more diversified and specialized based on user preferences of to satisfy user's demand.

In this circumstance, since menu manipulation still occupy the majority of methods for controlling mobile terminals, there is a problem that the user should go through several steps of inputting keys on the menu to use a desired service. In addition, the mobile terminal cannot be equipped with a pointing input device such as a mouse. Accordingly, there is a limit that the mobile terminal cannot easily control information of a specific location. It is possible to mount a touch pad to overcome the above problem. However, mounting the touch pad requires an expensive hardware and it is inconvenient for the user to carry the mobile terminal with the touch pad.

Meanwhile, an interface technology for controlling a system through voice recognition and motion of the pupil of the eyes has been diversely developed along with development of a living body recognition technology.

Korea Patent Publication No. 2003-0010279 (reference 1), which is published on Feb. 5, 2003, discloses a computer system supporting voice recognition and a method for controlling the same. It is a technology that a user can control the system through voice recognition in the system without a voice recognition function. According to the technology, a command inputted through voice recognition is transformed into a form of a key board input signal or a mouse input signal for executing a system operation mode corresponding to the command, and inputting the signal in the system. Accordingly, a general application program can be operated by voice even though it does not support a voice recognition function.

The reference 1 can provide the above function, only when information related to control of a general application program is acquired in advance. However, since the control information is generally dependant on the application program, there is a problem that the control information is not acquired easily.

Korea Patent Publication No. 2002-0082369 (reference 2), which is published on Oct. 31, 2002, discloses a menu selecting interface apparatus of a mobile communication terminal. The reference 2 introduces a technology where a motion of the pupil of the user eyes is sensed by using a camera mounted in a next-generation mobile communication terminal and a user select a menu by moving his/her pupils. The technology can realize a handsfree interface and raise availability of the terminal.

However, since the reference 2 tracks the pupil of the user by using the camera, there are spatial limitation that the user should come into sight of the camera, and an environmental limitation such as the presence and intensity of light. Also, since the motion of the pupil of the eyes is sequential, the pupil of the eyes should be moved a lot to input much information and it makes the user tired.

DISCLOSURE OF INVENTION

Technical Problem

It is, therefore, an object of the present invention to provide an input/output apparatus that can input and execute pointing input data and commands to control a system or an application program according to a voice command of a user based on a voice recognition technology without a hardware pointing input device such as a mouse and a touch pad, and a method thereof.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided an input/output apparatus based on voice recognition, including: a voice recognizer for recognizing a voice command inputted from outside; a pointing controller for calculating a pointing location on a screen which corresponds to a voice recognition result transmitted from the voice recognizer; a displayer for displaying a screen; and a command controller for processing diverse commands related to a current pointing location.

In accordance with another aspect of the present invention, there is provided an input/output method based on voice recognition, including the steps of: a) recognizing a voice command inputted from outside; b) calculating a pointing location on a screen corresponding to the recognized voice command; c) displaying the calculated pointing location to be identified; and d) executing diverse commands related to the pointing location.

Advantageous Effects

The present invention can provide a convenient interface since diverse pointing and control of an application program are performed through voice input of the user without individual hardware.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on related art may obscure the points of the present invention, the detailed description will not be provided herein. The preferred embodiments of the present invention will be described in detail hereinafter with reference to the attached drawings.

The present invention recognizes a voice command of a user and makes pointing input on screen, execution of diverse commands, an event process including click, double-click and scrolling, and control of an application program possible. Accordingly, the user can conveniently use a service through voice recognition without an additional input device, e.g., a mouse and a touch pad.

In a detailed description below, a case that an input/output apparatus of the present invention is applied to a mobile terminal with a microphone will be described as an example. Herein, the microphone of the mobile terminal is used to input voice data of the user.

Figure 1:
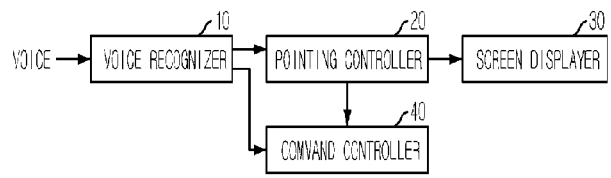
FIG. 1 is a block diagram showing an input/output apparatus based on voice recognition in accordance with an embodiment of the present invention.

FIG. 1 is a block diagram showing an input/output apparatus based on voice recognition in accordance with an embodiment of the present invention. The input/output apparatus based on voice recognition of the present invention includes a voice recognizer 10, a pointing controller 20, a screen displayer 30 and a command controller 40.

The voice recognizer 10 recognizes a voice command from the user. The pointing controller 20 receives a voice command recognition result from the voice recognizer 10 and transforms the voice command recognition result into a corresponding location information on a screen.

The screen displayer 30 displays a screen and the command controller 40 processes an event command related to a pointing location, and an execution command.

The voice recognizer 10 performs analog-to-digital (A/D) transformation on the user voice inputted through the microphone (not shown), extracts a feature vector, and performs a pattern matching by using a pre-stored recognition model parameter.

Linear Predictive Coefficients (LPC), Mel-frequency Cepstral Coefficients (MFCC) and Perceptual Linear Prediction (PLP) can be used as the feature vector. The recognition model parameter is obtained by collecting and learning voices of many people in diverse modeling techniques such as Dynamic Time Warping (DTW), Neural Network and Hidden Markov Model (HMM).

The pointing controller 20 receives a voice command recognition result from the voice recognizer 10 and calculates a corresponding location on the screen. The pointing controller 20 divides the screen into a plurality of regions having a pre-determined size, i.e., blocks, by calculating the pointing location on the screen from a voice recognized command and performs mapping on a voice recognition command for designating each divided region to a voice recognition candidate command.

Each of the divided region blocks can be divided again through many procedures in the same method and it makes minute pointing through the voice possible. It will be described in detail hereinafter with reference to FIGS. 3 and 4.

The screen displayer 30 displays the pointing location calculated by the pointing controller 20 and provides a feedback to the user. That is, the screen displayer 30 reorganizes a screen by duplicating a region corresponding to the pointing location calculated by the pointing controller 20 on the convention screen, and shows the screen to the user.

The command controller 40 processes an event registered in a current pointing location, i.e., an event command for click, double-clicks and scroll up/down, or processes an execution command for control of a general application program, e.g., a Button program, and setup of a system. Information is transformed and transferred to an operating system such that the event command generated in the pointing location can be executed in the same way as a mouse executes a command.

Figure 2:
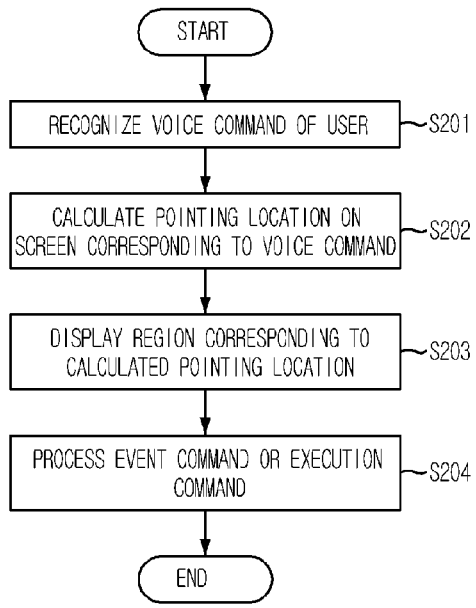
FIG. 2 is a flowchart describing an input/output method based on voice recognition in the input/output apparatus in accordance with an embodiment of the present invention FIG. 3.

FIG. 2 is a flowchart describing an input/output method based on voice recognition in the input/output apparatus in accordance with an embodiment of the present invention.

The voice recognizer 10 recognizes the user voice inputted through the microphone as a voice command at step S201.

The pointing controller 20 calculates a pointing location on a screen corresponding to the command, on which voice recognition is performed by the voice recognizer 10 at step S202.

The screen displayer 30 displays the region corresponding to the calculated pointing location to make the user identify the region at step S203.

The command controller 40 processes an event command or an execution command at step S204. For example, the command controller 40 clicks and operates an icon located in a specific region. Herein, the event command includes diverse commands such as click, double-clicks and scroll up/down, and the execution command includes diverse commands for setup of a system and control of an application program.

If the screen of the screen displayer 30 is divided into multiple levels and the pointing input is requested many times, it can be realized to recognize the voice command of the user in multiple levels, and operate each constituent element according to the voice command.

Figure 3:
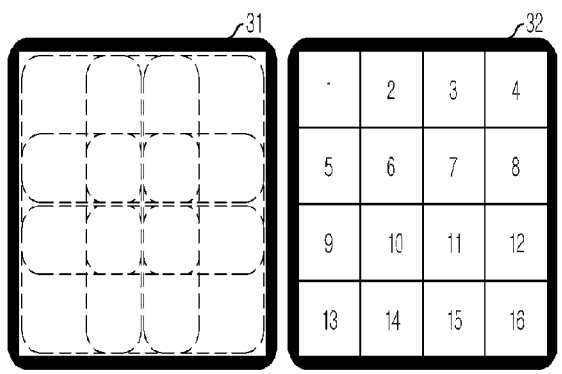
FIG. 3 is a view showing screen division of each region for mapping voice to voice recognition commands in the input/output apparatus in accordance with an embodiment of the present invention.

FIG. 3 shows screen division of each region for mapping voice to the voice recognition command in the input/output apparatus in accordance with an embodiment of the present invention.

A screen can be divided into regions to be mapped with voice recognition commands. The regions can be divided to be overlapped as shown in the reference number 31 of FIG. 3 by using numbers located similarly to a key array as shown in the reference number 32.

That is, a block 1 is formed of regions including sub-blocks 1, 2, 5 and 6, and a block 2 is formed of regions including sub-blocks 2, 3, 6 and 7. A block 3 is formed of regions including sub-blocks 3, 4, 7 and 8. A plurality of blocks can be formed in the same method such that their sub-blocks can be duplicated.

Each of the regions is matched with the voice recognition command designating a corresponding block.

The regions can be formed not to be overlapped, or to have a different shape from each other. The region forming method can be applied as a letter input method of a phoneme unit based on the voice recognition by dividing a screen into regions similarly to the key array on the key pad.

Figure 4:
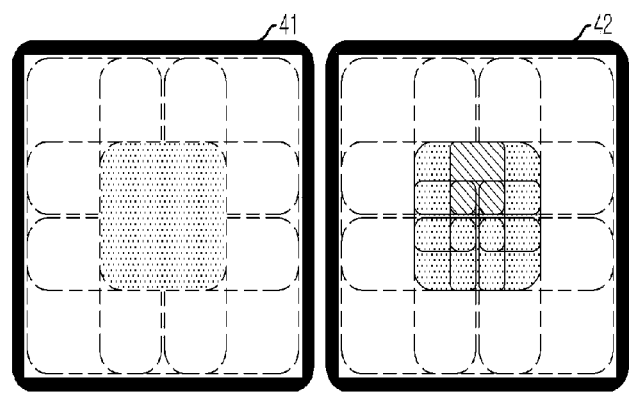
FIG. 4 is a view showing a pointing process in the input/output apparatus in accordance with the embodiment of the present invention.

FIG. 4 is a diagram showing a pointing process in the input/output apparatus in accordance with the embodiment of the present invention.

Minute pointing can be performed by dividing the screen into the multiple levels. FIG. 4 shows a case that the screen is divided into two levels.

That is, pointing precision can be raised by once dividing entire screen into a plurality of regions which are overlapped with each other in the same method as described in FIG. 3 and dividing each region once again in the same method. That is by executing pointing region division twice.

For example, the first result of pointing of the block 5 is shown in "41" and the second result of pointing of the block 2 in the inside of the pointed block 5 as shown in "2".

Figure 5:
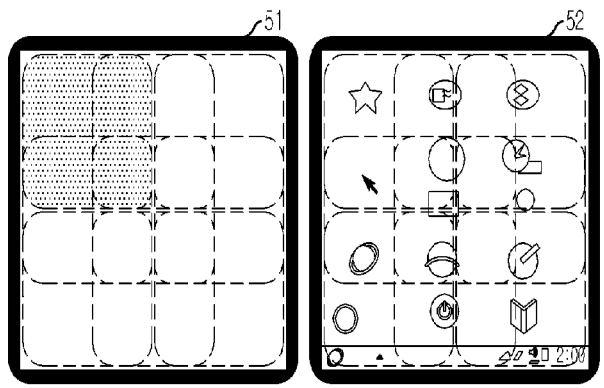
FIG. 5 is a view describing application program control in the input/output apparatus in accordance with the embodiment of the present invention.

FIG. 5 is a diagram describing application program control in the input/output apparatus in accordance with the embodiment of the present invention.

A user can control an application program by inputting pointing data. The pointing data may be inputted once, but it is also possible to input pointing data several times. A case that a Button program is operated after inputting pointing data three times will be described in detail, hereinafter.

When the user operates the Button program of the screen, he/she points the block 1, which is shown in a reference number 51 of FIG. 5, and points the block 7 in the inside of the pointed block 1, which is shown in a reference number 52.

In each pointing process, the selected region or block is marked to be identified by the user. Since a Button icon is positioned in the block 2 of the selected region, the user points the block 2 and executes a "BUTTON" program by saying a voice command such as "click". The three pointing processes are performed by saying such voice commands as "block 1", "block 7" and "block 2".

The present invention makes it possible to perform event processes including click, double-click and scrolling, control an application program, and setup a system by saying voice commands without an additional hardware input device, e.g., a mouse and a touch pad. Accordingly, the user can perform a desired computing work with his/her hands free. For example, it can make those who cannot use their hands freely input/output data.

When applied to a mobile terminal, the input/output apparatus of the present invention receives the voice commands from a user through a microphone mounted in a mobile terminal. That is, since the input/output apparatus does not require additional hardware, it is very useful in a small mobile terminal.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains subject matter related to Korean patent application No. 2005-0107944, filed in the Korean Intellectual Property Office on Nov. 11, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An input/output apparatus based on voice recognition, comprising:
 a voice recognizing means for recognizing a voice command inputted from outside;
 a pointing control means for calculating a pointing location on a screen which corresponds to a voice recognition result transmitted from the voice recognizing means;
 a displaying means for displaying a screen; and
 a command control means for processing diverse commands related to a current pointing location;
 wherein the voice recognizing means performs analog-to-digital (A/D) transformation on a user voice corresponding to the voice command, extracts a feature vector based on the A/D transformation user voice, and performs a pattern matching for the feature vector by using a recognition model parameter;
 wherein the pointing control means performs mapping on a voice recognition command corresponds to the voice recognition result to a voice recognition candidate command;
 wherein the displaying means displays the screen by duplicating a region corresponding to the calculated pointing location on a prior screen;
 wherein the screen is divided into blocks, and the blocks are divided into sub-blocks;
 wherein neighbor blocks in the blocks identically include parts of the sub-blocks, and the neighbor blocks are duplicated by the parts of the sub-blocks.

2. The apparatus as recited in claim 1, wherein the command control means processes event commands including click, double-clicks and scrolling.

3. The apparatus as recited in claim 1, wherein the command control means processes execution commands for controlling an application program and setting up of a system.

4. The apparatus as recited in claim 1, wherein the pointing control means calculates the pointing location by dividing the screen into a plurality of regions having a predetermined size.

5. The apparatus as recited in claim 4, wherein the pointing control means calculates the pointing location by re-dividing each region in multiple levels for minute pointing.

6. An input/output method based on voice recognition, comprising the steps of:
 a) recognizing a voice command inputted from outside;
 b) calculating a pointing location on a screen corresponding to the recognized voice command;
 c) displaying the calculated pointing location to be identified; and
 d) executing diverse commands related to the pointing location;
 wherein the step of a), performs analog-to-digital (A/D) transformation on a user voice corresponding to the voice command, extracts a feature vector based on the A/D transformation user voice, and performs a pattern matching for the feature vector by using a recognition model parameter;

wherein the step of b), performs mapping on a voice recognition command corresponds to the voice recognition result to a voice recognition candidate command;

wherein the step of c), displays the screen by duplicating a region corresponding to the calculated pointing location on a prior screen;

wherein the screen is divided into blocks, and the blocks are divided into sub-blocks;

wherein neighbor blocks in the blocks identically include parts of the sub-blocks, and the neighbor blocks are duplicated by the parts of the sub-blocks.

7. The apparatus as recited in claim 1, wherein the feature vector includes a Linear Predictive Coefficients (LPC), a Mel-frequency Cepstral Coefficients (MFCC), and a Perceptual Linear Prediction (PLP).

8. The apparatus as recited in claim 1, wherein the recognition model parameter is obtained by using a Dynamic Time Warping (DTW), a Neural Network, and a Hidden Markov Model (HMM).

9. The method as recited in claim 6, wherein event commands for click, double-click and scrolling are processed in the step d).

10. The method as recited in claim 6, wherein execution commands for controlling an application program or setting up of a system are processed in the step d).

11. The method as recited in claim 6, wherein the pointing location is calculated by dividing the screen into a plurality of regions having predetermined size in the step b).

12. The method as recited in claim 11, wherein in the step b), the regions are re-divided in multiple levels and a minute pointing location is calculated in a sequence of the voice commands.

13. The method as recited in claim 6, wherein the feature vector includes a Linear Predictive Coefficients (LPC), a Mel-frequency Cepstral Coefficients (MFCC), and a Perceptual Linear Prediction (PLP).

14. The method as recited in claim 6, wherein the recognition model parameter is obtained by using a Dynamic Time Warping (DTW), a Neural Network, and a Hidden Markov Model (HMM).

* * * * *